United States Patent
Kim et al.

(10) Patent No.: US 6,711,144 B1
(45) Date of Patent: Mar. 23, 2004

(54) MULTI-USER COMMUNICATION OF VOICE AND DATA

(75) Inventors: Dae-Young Kim, Lexington, MA (US); M. Vedat Eyuboglu, Concord, MA (US); Pierre A. Humblet, Cambridge, MA (US)

(73) Assignee: Airvana, Inc., Acton, MA (US)

( * ) Notice: Subject to any disclaimer, the term of this patent is extended or adjusted under 35 U.S.C. 154(b) by 533 days.

(21) Appl. No.: 09/663,498

(22) Filed: Sep. 15, 2000

(51) Int. Cl.[7] .............................................. H04B 7/216
(52) U.S. Cl. ....................... 370/335; 370/337; 370/342; 370/347
(58) Field of Search ................................ 370/328, 335, 370/342, 337, 347, 329, 341, 431, 442, 441

(56) References Cited

U.S. PATENT DOCUMENTS

| | | | | |
|---|---|---|---|---|
| 5,805,581 A | * | 9/1998 | Uchida et al. | 370/335 |
| 6,249,683 B1 | * | 6/2001 | Lundby et al. | 455/522 |
| 6,320,873 B1 | * | 11/2001 | Nevo et al. | 370/466 |
| 6,526,036 B1 | * | 2/2003 | Uchida et al. | 370/342 |

FOREIGN PATENT DOCUMENTS

| | | |
|---|---|---|
| EP | 0 932 267 A | 7/1999 |
| WO | 00 54437 A | 9/2000 |
| WO | 01 86837 A | 11/2001 |

OTHER PUBLICATIONS cdma2000 High Rate Packet Data Air Interface Specification; 3GPP2 C.S0024; Version 4.0; Oct. 25, 2002; 3rd Generation Partnership Project Z "3GPPZ".

Viterbi, A.J., "CDMA Principles of Spread Spectrum Communication", Addison–Wesley Wireless Communications, (1995).

Prasad R. et al, "Hybrid TDMA/CDMA Multiple Access Protocol for Multi–Media Communications", IEEE International Conference on Personal Wireless Communications Proceedings, Feb. 19, 1996, pp. 123–128.

* cited by examiner

*Primary Examiner*—Ajit Patel
(74) *Attorney, Agent, or Firm*—Fish & Richardson P.C.

(57) ABSTRACT

Data is sent in some time slots of a forward link from a base station to at least one remote station in a wireless communication system, and voice information is sent from the base station to the at least one remote station in some other time slots of the forward link, the data being sent in a time division multiple access (TDMA) mode, the voice data being sent in a code division multiple access (CDMA) mode.

17 Claims, 5 Drawing Sheets

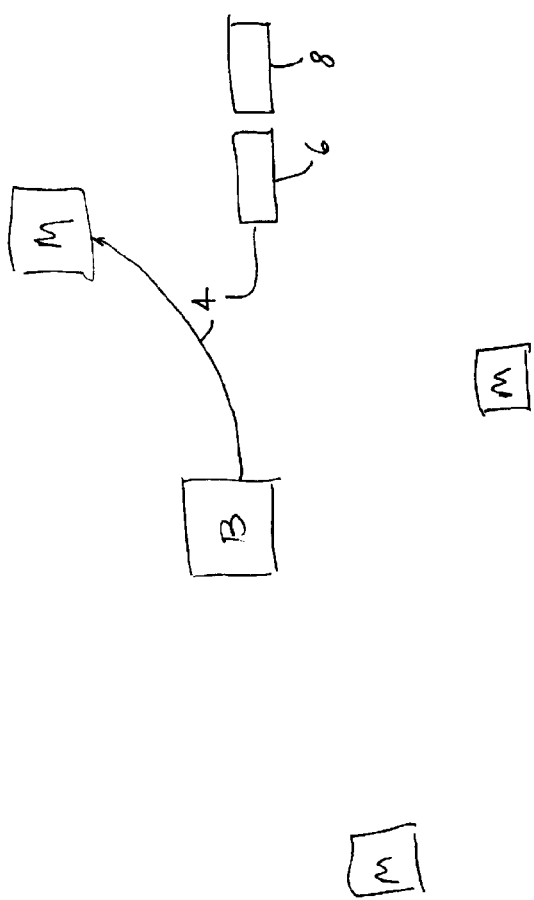

MULTI-USER COMMUNICATION OF VOICE AND DATA

This invention relates to multi-user communication of voice and data.

BACKGROUND

In wireless cellular communications, a large geographic area is divided into cells, each served by a single base station communicating with multiple users in its cell.

3GPP2, a standards organization developing 3rd-generation wireless communication standards, is developing a new wireless air interface standard called 1xEV-DO, described in Baseline Text for the 1xEV-DO Physical Layer: -2000821-021-1xEV_Phy_Layer_Spec_v21, and Baseline Text for the 1xEV-DO Upper Layers (excluding Physical Layer): C30-20000821-021-114b Editor, 1xEV-DO-Sig.baseline_v55_clean, both available from 3GPP2

This standard supports high-speed data communications between MS's and their BS (acronyms used in this discussion are defined below) at bit rates of up to 2.457 Mbit/s in the forward link (from BS to MS's) using only 1.25 MHz of spectrum. However, 1xEV-DO cannot efficiently support delay-sensitive, low-rate traffic, such as voice. One can carry voice packets in a 1xEV-DO system using VoIP, however, such an approach wastes significant amounts of bandwidth since the physical layer packet size of 1xEV-DO is much bigger than the size of VoIP packets.

For convenience, the following acronyms used here have the indicated meanings.

| | |
|---|---|
| 1xEV-DO | 1xEV-Data Only |
| 1xEV-DV | 1xEV-Data and Voice |
| 3GPP2 | 3rd Generation Partnership Project 2 |
| BS | Base Station |
| CDMA | Code Division Multiple Access |
| CRC | Cyclic Redundancy Checksum |
| IS-95 | TIA/EIA Interim Standard 95 |
| MS | Mobile Station |
| SIR | Signal to Interference Ratio |
| TDMA | Time Division Multiple Access |
| VoIP | Voice over Internet Protocol |

SUMMARY

In general, in one aspect, the invention features a method that includes sending data in some time slots of a forward link from a base station to at least one remote station in a wireless communication system, and sending voice information from the base station to the at least one remote station in some other time slots of the forward link, the data being sent in a time division multiple access (TDMA) mode, the voice information being sent in a code division multiple access (CDMA) mode.

Implementations of the invention may include one or more of the following features. The data and voice information may be sent in a manner that is compatible with a remote station that is receiving data from the base station according to the 1xEV-DO standard. The CDMA mode may include assigning more than one Walsh code to a single voice call. The time slots in which voice information is sent may be chosen so that at least every fourth slot is not used for voice information and is available for sending the data. The voice information may be sent to different remote stations. The time slots may be used only as needed for sending voice information. The codes assigned to different remote stations may be allocated different power levels for the voice information. Each code used in a voice time slot may be allocated only enough power to achieve a predetermined voice quality.

Other advantages and features will become apparent from the following description and from the claims.

DESCRIPTION

We first briefly describe the drawings.

FIG. 5 shows a block diagram of a multi-user communication system.

Figure 1:
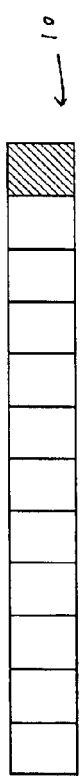
FIG. 1 shows time slot allocations.
Figure 1:
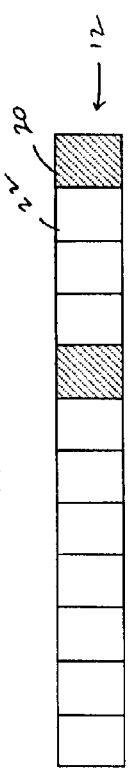
Figure 1:
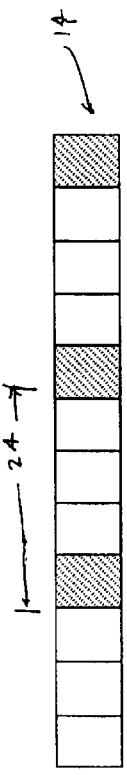
Figure 1:
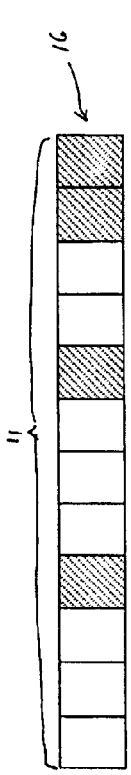
Figure 1:
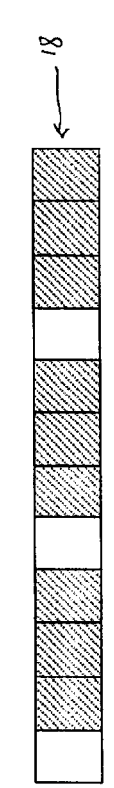

An efficient air interface for wireless communications between a BS and multiple MS's in its cell can be provided, which can support both voice and data on the same carrier, while being compatible with the existing 1xEV-DO in the sense that it can work with data-only MS's that are compatible with 1xEV-DO.

A voice encoder used in IS-95 systems supports 4 data rates: 8.6, 4.0, 2.0 or 0.8 kbit/s. After adding CRC and a few encoder tail bits, the actual output bit rate of the encoder is 9.6, 4.8, 2.4 or 1.2 kbit/s. This voice encoder output is then channel coded using a rate ½ convolutional code resulting in a coded symbol rate of 19.2, 9.6, 4.8 or 2.4 ksps. The resulting symbols are repeated 1, 2, 4 or 8 times to obtain a fixed symbol rate of 19.2 ksps. At the same time the transmitted power is adjusted by a scaling factor of 1, ½, ¼, or ⅛ in order to take advantage of voice activity and thereby reduce overall system interference (this provides a gain in system capacity by more than a factor of 2, see A. J. Viterbi, *CDMA Principles of Spread Spectrum Communication*.) The voice encoder generates 1 voice frame every 20 ms. Depending on the voice encoder rate, the size of these frames can range from 24 bits to 184 bits. (The above example used a 9.6 kbit/s voice coder; similar numbers can be calculated for a 14.4 kbit/s voice coder.)

The 1xEV-DO standard has two main components: a forward link which is based on TDMA principles, and a reverse link (from an MS to the BS) which is based on CDMA principles. Supporting voice traffic on the reverse link is relatively straightforward and can be accomplished with relatively small modifications. Therefore, in what follows, we are going to focus our discussion on the forward link.

On its forward link, 1xEV-DO standard uses 1/600=1.667 ms time slots and supports data rates of R=k×38,400 bit/s, where k=1, 2, 4, 8, 16, 24, 32, 48 or 64. It follows that each time slot can carry k×64 bits. At the highest data rate of 2,457.6 kbit/s (k=64), each slot carries 4096 bits, while at the lowest rate of 38.4 kbit/s (k=1) each slot will only carry 64 bits. In order to accommodate these various data rates, 1xEV-DO has standardized on 4 packet sizes for physical layer packets: 1024, 2048, 3072 and 4096. Each packet is mapped into 1, 2, 4, 8 or 16 time slots, and when more than 1 time slot is used, successive time slots that the packet is mapped into have a 4-slot period between them. By using short packets for low rates and long packets for high rates, one could support all bit rates in 1, 2, 4, 8 or 16 time slots. It can be seen that these packets are too long for delay-sensitive, fixed low-rate traffic sources such as voice. In voice communications, encoded voice frames should be sent with very short delay, which implies that a frame has to be sent every 20 msec. It can be seen that the voice frame size (given above for an IS-95 voice encoder) is very small compared to the packet size of the 1xEV-DO air interface. Therefore, carrying voice packets in 1xEV-DO physical layer packets of 1024–4096 bits wastes (e.g., 82–99%) of air resources.

One can reduce the time slot duration of 1xEV-DO in order to support short packets. However, to take advantage of voice activity, voice packets need to be of variable length occupying different number of slots, and this would require a complex physical layer addressing scheme.

FIG. 5 shows a system 2 which can support voice together with high-speed data with excellent spectral efficiency and low system complexity. In this system, forward link time slots 4 are divided into two groups: voice time slots 6 and data time slots 8. Data time slots are used in exactly the same fashion as in 1xEV-DO to support high-speed data users in a TDMA fashion. Voice slots are used to carry voice traffic to multiple voice users in a CDMA fashion. Power control is used to allocate available power in voice time slots among multiple voice users to ensure that even the voice users who are furthest from the BS can maintain a minimum information rate of 9.6 kb/s. As a result, voice activity can be exploited in a way similar to IS-95. Further, the system is backward compatible with 1xEV-DO MSs. A 1xEV-DO MS can communicate without any modifications with a BS that supports the proposed new air interface. Voice slots cannot be used to send data to 1xEV-DO MSs, but they can be used to send voice and data to new MS's that support this new air interface.

For both incoming (network-initiated) or outgoing (MS-initiated) calls, MS and BS use signaling messages to set up the voice call. Such messages are exchanged using a shared forward control channel and a reverse access channel. During this set-up procedure, voice time slots and Walsh codes (used for orthogonal multiplexing of voice users) are assigned to the MS by the BS. In what follows, we continue to concentrate on the forward link, since the reverse link used in 1xEV-DO can be used with few small changes to support voice (some of these changes, such as the coding scheme, forward power control channel, will be explained later).

As shown in FIG. 1, to support voice traffic, 1xEV-DO time slots are grouped into frames 11, which consist of 12 consecutive time slots. A frame has a duration of 12/600=20 ms, which corresponds to the needs of a typical voice encoder. Up to 9 time slots can be allocated to voice in each frame. Several examples 10, 12, 14, 16, 18 of voice time slot allocations are given in FIG. 1 for different proportions of voice slots per frame. The voice slots 20 are shown shaded. The unshaded slots 22 are data slots. Since in 1xEV-DO, data packets are mapped into time slots with a 4-slot period between successive slots of the same packet. For example, if the first time slot of a multi-slot packet is time slot #0, the next time slot will be time slot #4. Therefore, it is advantageous to similarly allocate voice slots with a separation 24 of 4 time slots as illustrated in FIG. 1.

Once a call has been set up, the MS knows a priori which slots are voice slots without the help of a preamble since MS maintains synchronization with BSs. The MS also knows which Walsh codes (See A. J. Viterbi, *CDMA Principles of Spread Spectrum Communication*, for a discussion of Walsh codes.) to use for receiving voice transmissions. Note that multiple Walsh codes can be assigned to a single voice user. When a new voice call arrives, the BS determines if it can admit that call in an existing voice time slot. In making such admission control decisions, the BS needs to estimate the probability that it can support this new call without affecting other on-going calls and make sure that this probability is less than some minimum target. If admitted, the new voice call goes into existing voice time slots. Otherwise, the BS may allocate additional time slots for voice or redirect the call to another frequency carrier. As new voice slots are added, the BS can reassign the same Walsh codes to MS's.

The forward link of the 1xEV-DO air interface uses so-called Synchronous Control Channel Capsules to send paging and other wake-up information to MS's. To avoid conflicts with such control signaling, the voice slot assignments are slightly modified as shown in FIG. 1. The synchronous capsule occurs every 256 slots, which is called Control Channel Cycle. When a Control Channel (CCH) Cycle starts in the first slot of a 12-time-slot frame, then the next CCH Cycle starts at the $5^{th}$ slot of a frame and the next one starts at the $9^{th}$ slot of a frame, then it repeats at the first slot of the frame. Therefore, if a BS assigns voice slots as shown in FIG. 1, avoiding $1^{st}$, $5^{th}$ and $9^{th}$ slots, then there will be no conflict between voice slots and Synchronous Control Channel Capsules. A useful order for assigning time slots for voice: 12, 8, 4, 11, 7, 3, 10, 6, and 2. 1xEV-DO also supports the option of an extended synchronous capsule that has a duration of 2 timeslots. This option will still be available as long as $2^{nd}$, $6^{th}$ and $10^{th}$ timeslots are not assigned to voice, which is the case for examples 1-d shown in FIG. 1. If the $2^{nd}$, $6^{th}$, or $10^{th}$ slots are used as voice slots, to support extended synchronous capsule voice slots can be overwritten by control capsule at the expense of voice performance.

To ensure backwards compatibility with 1xEV-DO MSs, it is important that voice slots not confuse existing 1xEV-DO MS's. There are two ways for accomplishing this: (1) Insert a short-length preamble (say the minimum preamble length of 64 chips in the 1xEV-DO standard), which has not been assigned to any active 1xEV-DO MS, at the beginning of each voice slot; (2) since the probability that the superposition of encoded voice frames looks like a valid preamble is low (compared to the packet error rate), we can skip the preamble altogether. In fact, the 1xEV-DO air interface uses a preamble only in the first slot of a multi-slot packet and the 1xEV-DO MS can already handle this situation. Further, the BS will make sure to use more than one Walsh Code in voice slots, since there is a high chance that the data can mimic a preamble if only one Walsh is used for a voice slot.

Figure 2:
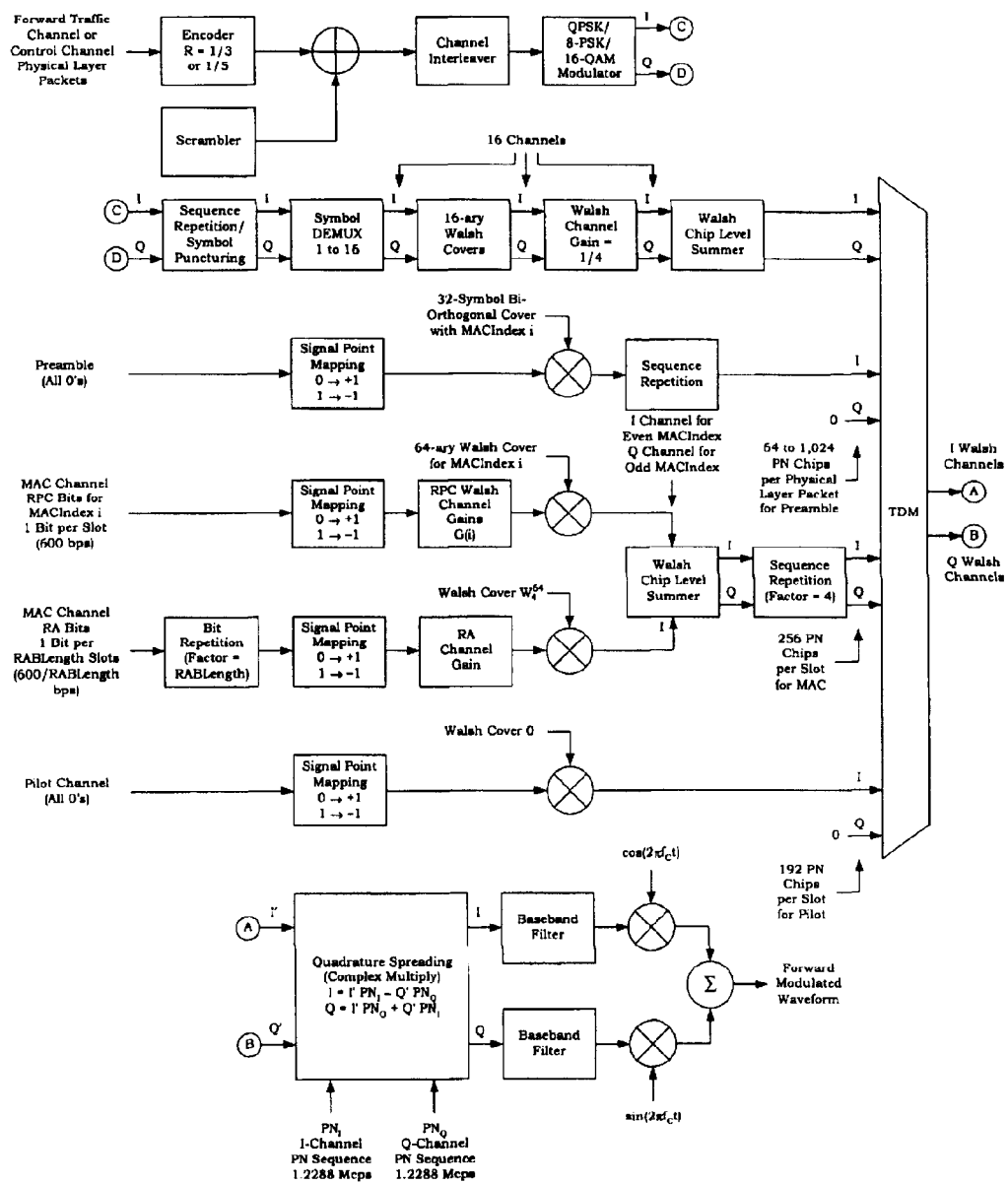
FIG. 2 shows a forward channel structure of 1xEV-DO.
Figure 3:
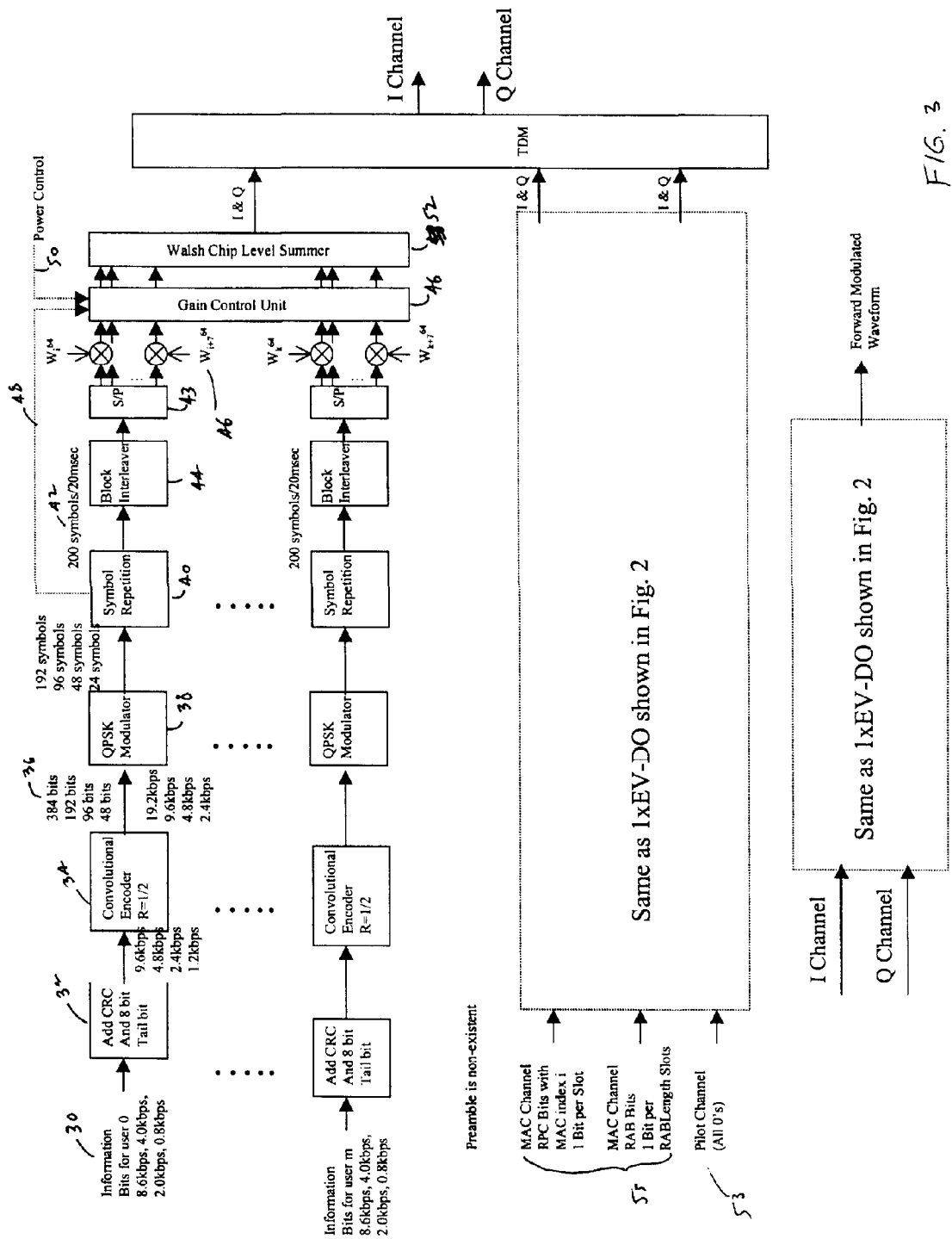
FIG. 3 shows a forward channel structure for voice slots.
Figure 4:
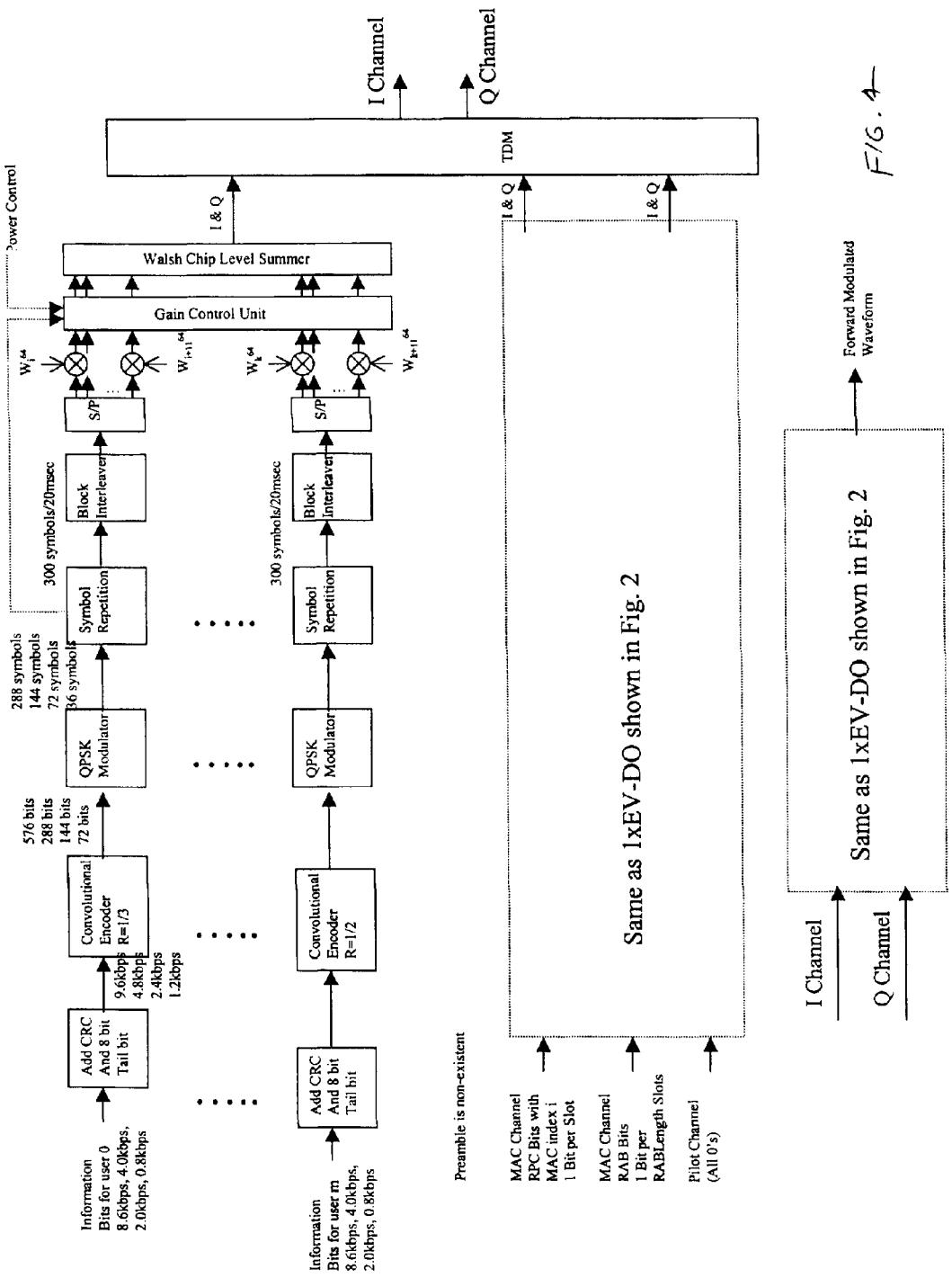
FIG. 4 shows another forward channel structure for voice slots.

FIG. 2 shows the existing forward channel structure of 1xEV-DO. FIG. 3 shows a forward channel structure for voice slots. For data slots, the structure of FIG. 2 is used. FIG. 3 assumes that one in every 12 time slots is reserved for voice. We also assumed that length-64 Walsh codes are used in voice time slots. In this case, 8 Walsh codes are assigned to each voice user. If K in every 12 slots are reserved for voice, round (8/K) Walsh codes are used for voice, assuming all voice users use all the voice time slots. FIG. 4 shows an alternative design, which uses more coding to improve reliability, but requires the allocation of 12/K Walsh codes when K voice slots are in use. One can design the system in a way that the BS can give one voice user the coding scheme shown in FIG. 3 and another voice user the coding scheme shown in FIG. 4.

In FIG. 3, we assumed that an IS-95 9.6 kbps voice encoder is used. This encoder has an output bit rate 30 of 8.6, 4.0, 2.0 or 0.8 kbit/s. Therefore, every 20 ms, the encoder outputs 172, 80, 40 or 16-bit frames. CRC and tail bits are added 32 to these frames. After rate ½ convolutional encoding 34, each frame will have 384, 192, 96 or 48 bits 36, or 192, 96, 48 or 24 QPSK 38 symbols. Though not shown in the Figure, one can add an IS-95 type (which is based on user's long code as defined in IS-95) scrambler after the convolutional encoder. QPSK symbols are repeated 40 to obtain a frame 42 of 200 symbols and are then interleaved 44. The 200 interleaved symbols are divided 43 into 8 groups of 25 symbols. Each group of 25 symbols is covered by a unique length-64 Walsh code 44 assigned to the user. The gain control unit 46 calculates the gain term for each user based on repetition rate 48 and forward power control information 50, so that the user can receive the signal with just enough SIR to reliably decode the information. The resulting signals are then combined 52, PN spread and transmitted, as described in the 1xEV-DO standard.

Each time slot can carry 2048 chips at a chip rate of 1.2288 MHz. Of these 2048 chips, 192 are used for pilot transmission (for synchronization and channel estimation) and 256 are used for MAC (power control and reverse activity bit for high-speed data), leaving 1600 chips for payload. The 8 groups of 25 symbols produced as described above, after 64-Walsh covering and combining, produce exactly 64×25=1600 chips of data, which fits exactly into the payload portion of the time slot.

The scheme described here does not use power control across time slots, but different voice users are allocated different power levels in voice time slots in order to equalize their SIR's. There are two ways to allocate the power: 1) give just enough power to each user to achieve a certain voice quality. In this case, the total power used in a voice time slot will fluctuate. Data transmission from other BSs can benefit from such reduced power, as they will experience less interference since the BS is transmitting less than full power. The proposed scheme uses physical layer ARQ (Automatic Repeat Request) for data time slots where a multi-slot packet is terminated as soon as an acknowledgment is received. Therefore, reduced interference can increase the throughput delivered by other BS's. 2) Alternatively, once power per user is calculated as in the first method, the BS can increase the power of all users proportionally to reach full power. This helps improve the reliability in voice time slots, while data time slots experience the same performance as in 1xEV-DO.

When a new voice call arrives, the BS can admit that call in an existing time slot if there is enough power available to support that new call and provided unused Walsh codes are available. If this is not the case, the BS should either reject (or redirect) the call, or assign another voice time slot. The voice slot assignment should be done as shown in FIG. 1 to ensure that it will not block the transmission of a low rate (and therefore multi-time slot) data packet. When a new voice time slot is assigned, the BS can reassign the time slots and Walsh codes to existing users to best utilize the resources. For example, it is better for the users to use fewer Walsh codes and more voice time slots, since the average power will be more stable when there are more variable-rate users in the same voice slot and therefore there is less chance for the total power to exceed the power limit.

As one MS's reverse link affects other MS's reverse link only to the extent it creates interference for it, the modification in an MS's reverse link can be made without backward compatibility problem to existing 1xEV-DO MSs. Possible modifications include 1) forward per-user power control, 2) reverse link coding, 3) reverse link coding and modulation to exploit voice activity, 4) reduced frame size. These will be explained below.

To facilitate the forward per-user power control, one can add a power control channel in the reverse link. This can be done easily by using a Walsh code that is not used in the current 1xEV-DO standard. If the received voice SIR is higher than what is needed, the MS can request a reduction of the power allocated to him. If the received voice SIR is lower than what is needed, the MS can request an increase of the power allocated to him.

Reverse link coding can also be modified to convolutional coding (instead of Turbo Coding of 1xEV-DO) to reduce the encoding delay for the voice traffic.

For MSs that support voice, we can define fixed voice time slots in the reverse link as was done for forward link. However, we prefer for the data and voice to share the same time slot and define higher layer (say MAC layer) multiplexing of voice and data packet. As was done in 1xEV-DO, the reverse link rate will be chosen just high enough to send the required data. The frame size needs to be reduced to 20 msec from 26.66 msec of 1xEV-DO.

Voice and Data from the same MS can be multiplexed in reverse link using different Walsh codes. This can be thought of as adding extra Walsh codes to existing 1xEV-DO reverse link transmission. The data can maintain the 1xEV-DO frame structure, while voice can adopt a 20 msec frame size.

To exploit voice activity gain, the new voice supporting MSs can send voice in the reverse link in two ways: 1) If the voice packet is small (for example, say 0.8 kbit/s voice coder rate) one can occupy only a part of the 1.67 msec frame at a random location. 2) If the voice packet is small, say N times smaller than highest rate, one can repeat the packet N times and transmit at 1/N of the power than highest rate.

So far we have assumed that soft handoff is not used for voice channels. However, soft handoff can be accommodated easily. If a user at a sector boundary needs soft handoff, each BS can assign voice resources to the MS. Voice time slots do not have to be aligned, as long as the MS knows the position of the voice time slots and the Walsh codes assigned to him from each of the BSs. Receiving data from one BS, soft-handoff voice from another BS in the same time slot will increase MS complexity, since it will have to decode both voice and data. There are two ways to avoid this problem: 1) The BS data scheduler knows which slots are used for soft-handoff voice for a particular MS from other BSs and avoids assigning data slots to him in those time slots. 2) BSs coordinate and synchronize their voice time slot assignments.

Other implementations are within the scope of the following claims. For example, another aspect of the present invention is to add a supplemental data channel or a shared channel to the Walsh codes (not used for voice) in voice time slots in order to allow MS's receive data in voice time slots.

What is claimed is:

1. A method comprising sending data in some time slots of a forward link from a base station to at least one remote station in a wireless communication system, and sending voice information from the base station to the at least one remote station in some other time slots of the forward link, the data being sent in a time division multiple access (TDMA) mode, the voice information being sent in a code division multiple access (CDMA) mode, in which different remote stations are allocated different power levels for the voice information by allocating different power levels to the Walsh codes to which the voice information is allocated.

2. The method of claim 1 in which the data and voice information are sent in a manner that is compatible with a remote station that is receiving data from the base station according to the 1xEV-DO standard.

3. The method of claim 1 in which the CDMA mode includes assigning more than one Walsh code to a single voice call.

4. The method of claim 1 in which the time slots in which voice information is sent are chosen so that at least every fourth slot is not used for voice information and is available for sending the data.

5. The method of claim 1 in which the voice information is sent to different remote stations.

6. The method of claim 1 in which time slots are used for sending voice information only as needed.

7. The method of claim 1 in which each Walsh code is allocated only enough power to achieve a predetermined voice quality.

8. The method of claim 1 in which all available power is allocated on a proportionate basis among mobile stations to the slots that have been assigned voice information.

9. A method comprising sending data in some time slots of a forward link from a base station to at least one remote station in a wireless communication system, and sending voice information from the base station to the at least one remote station in some other time slots of the forward link, so that at least every fourth slot is not used for voice information and is available for sending the data the data being sent in a time division multiple access (TDMA) mode, the voice data being sent in a code division multiple access (CDMA) mode in which more than one Walsh code is assigned to a single voice call, the data and voice information being sent in a manner that is compatible with the sending of data in the forward link in the 1xEV-DO standard, different remote stations being allocated different power levels for the voice information.

10. Apparatus comprising a base station configured to send data in some time slots of a forward link from the base station to the at least one remote station in a wireless communication system, and to send voice information from the base station to the at least one remote station in some other time slots of the forward link, the data being sent in a time division multiple access (TDMA) mode, the voice data being sent in a code division multiple access (CDMA) mode, in which different remote stations are allocated different power levels for the voice information by allocating different power levels to the Walsh codes to which the voice information is allocated.

11. The apparatus of claim 10 in which the data and voice information are sent in a manner that is compatible with a remote station that is receiving data from the base station according to the 1xEV-DO standard.

12. The apparatus of claim 10 in which the CDMA mode includes assigning more than one Walsh code to a single voice call.

13. The apparatus of claim 10 in which the time slots in which voice information is sent are chosen so that at least every fourth slot is not used for voice information and is available for sending the data.

14. The apparatus of claim 10 in which the voice information is sent to different remote stations.

15. The apparatus of claim 10 in which time slots are used for sending voice information only as needed.

16. The apparatus of claim 10 in which each Walsh code is allocated only enough power to achieve a predetermined voice quality.

17. The apparatus of claim 10 in which all available power is allocated on a proportionate basis among mobile stations to the slots that have been assigned voice information.

* * * * *